United States Patent [19]

Haupt et al.

[11] 4,182,843

[45] Jan. 8, 1980

[54] METHOD FOR PRODUCING CASTINGS BY ACTIVATED ANIONIC POLYMERIZATION OF LACTAMS

[75] Inventors: Günter Haupt, Stadtbergen; Franz Fischer, Königsbrunn; Arthur Handtmann, Biberach an der Riss, all of Fed. Rep. of Germany

[73] Assignee: Eltera Kunstoff-Technik GmbH, Fed. Rep. of Germany

[21] Appl. No.: 817,747

[22] Filed: Jul. 21, 1977

[30] Foreign Application Priority Data

Jul. 26, 1976 [DE] Fed. Rep. of Germany ....... 2633560

[51] Int. Cl.$^2$ ............................................. C08G 69/44
[52] U.S. Cl. .................................... 528/326; 264/102; 264/331
[58] Field of Search .............................. 264/101–102, 264/331; 260/78 L; 528/326

[56] References Cited

U.S. PATENT DOCUMENTS

| 2,735,840 | 2/1956 | Lynch | 264/102 |
| 2,867,805 | 1/1959 | Ludewig | 264/102 |
| 3,494,999 | 2/1970 | Heckrotte | 264/331 |
| 3,505,448 | 4/1970 | Zijp et al. | 264/331 |
| 3,551,541 | 12/1970 | Rossetti | 264/102 |
| 3,551,552 | 12/1970 | Opalewski | 264/331 |
| 3,658,975 | 4/1972 | Drabek et al. | 264/331 |
| 3,752,623 | 8/1973 | Sinn et al. | 264/331 |

FOREIGN PATENT DOCUMENTS

1910175 9/1969 Fed. Rep. of Germany.
1570251 9/1970 Fed. Rep. of Germany.

*Primary Examiner*—Jeffery R. Thurlow
*Attorney, Agent, or Firm*—Frailey & Ratner

[57] ABSTRACT

An improved method for the production of castings by the anionic polymerization of lactams, particularly lauric lactam, in which two melts prepared separately, one with a catalyst and one with an activator, are polymerized together in a mold heated to substantially the same temperature as the melts, is described, the improvement comprising the application of a vacuum in the range from about 80 to 450 Torr, said vacuum being selected in accordance with the formula $S \times T = K$ where S is the surface area of the casting exposed to the vacuum, V is the volume thereof, T is the vacuum application time and is less than the polymerization time and K is a constant. Said vacuum is replaced by ambient pressure either progressively or instantaneously when the polymerization mixture reaches a highly viscous non-stirrable state. Thereafter, the polymer may be heat treated at a temperature about 10° to 20° C. below its crystallization melting range if desired during completion of the polymerization to inhibit the formation of shrinkage blow holes. The mold is preferably gas-tight.

4 Claims, No Drawings

METHOD FOR PRODUCING CASTINGS BY ACTIVATED ANIONIC POLYMERIZATION OF LACTAMS

The invention relates to a method for producing castings by the activated anionic polymerization of lactams, more particularly lauric lactam, in which two lactam melts, which are prepared separately one with a catalyst and one with an activator, flow without pressure into the cavity of a mold, heated substantially to the temperature of the melts, and are polymerized in said mold.

The German Offenlegungsschrift No. 1,910,175 states for a process of the above-mentioned kind that, owing to the low viscosity of the melts, it is necessary to use correspondingly liquid-tight moulds and no substances, more particularly water, which interfere with polymerization may be present in the melt. The specification also indicates that an initial temperature increase of approximately 50° C. occurs normally in the course of polymerization, the rate of which depends on temperature, and that to avoid blowholes and stresses in the final product efforts must be made to maintain a constant temperature for all units of volume of the moulding compound during the polymerizing process. A distinction is made between thick-walled and thin-walled castings and it is noted that shrinkage blowholes can form more readily in castings with a thicker wall because polymerization on the mould wall, which is critical in terms of heat dissipation, is more rapid than in more distant zones of the molding compound.

Such a temperature difference between the core and the outer skin of the casting is generally deemed to be responsible for the production of stresses and blowholes in the finished components and for the creation of whitish untidy surfaces containing monomers. Reheating the mould during polymerization is regarded as adequate for thin-walled castings to prevent this temperature difference in order to avoid such casting irregularities. However, for castings with thicker walls and in the interests of a correspondingly simplified process routine, it is the practice to use special molds comprising a combination of particularly heat-resistant and non-heat-resistant substances which are claimed to permit optimum temperature control of polymerization because the thermal conductivity of such molds is substantially lower than that of metal moulds.

The German Offenlegungsschrift No. 1,570,251 indicates that the entrainment of air bubbles with the flow of lactam melt into the mold, which is responsible for lack of homogeneity in the final product, can be prevented by the application of a vacuum. The investigations preceding the present invention have shown that such a prolonged application of vacuum does not result in stress-free and blowhole-free castings in the case of lauric lactams. On the contrary, under otherwise equal conditions, better results were obtained by the application of ambient pressure and bubble formation, at least initial bubble formation, was actually encouraged in the polymerizing moulding compound. This discovery corresponds to the principles indicated in the German Offenlegungsschrift No. 1,570,318 relating to a similar casting method in which the back-pressure, formed when a gas stream is bubbled through the molding compound, is utilized as an indicating variable or regulating variable for controlling the immersion depth of the supply duct for individual reagents. Corresponding tests designed to utilize this known process for preparing lauric lactam have however so far failed.

Within the scope of the present invention and more particularly when working with lauric lactam, the important knowledge was gained that among the different parameters which influence the production of reliable castings it is mainly the ratio of surface to volume of the relevant casting which defines the extent of the previously-described lack of homogeneity. Depending on this ratio, the principal feature of the present invention for a method of the kind described hereinbefore is the step by which polymerization of the lactam melts in the mold is initiated under vacuum which is removed when the melts reach a just unstirrable, highly viscous polymerization state, the vacuum being replaced by the application of ambient pressure.

This step prevents the appearance of otherwise detected whitish inclusions which can best be defined as bubble blowholes. The state of polymerization in which the material is highly viscous and just ceases to be stirrable is substantially the state of the molding compound which occurs approximately directly after an initially-noted and relatively intense foaming phase, the intensity of such foaming depending directly on the magnitude of the applied vacuum. This magnitude in turn depends on the ratio of vacuum-exposed surface to volume of the relevant casting. If the vacuum is not removed on completion of the relatively intensive foaming phase in the latent polymerization region, all pearly gas bubbles formed thereafter will be practically frozen in the course of progressive polymerization. It will then be no longer possible for gas bubbles, frozen by such steps, to be again removed from the casting.

In this context it is also important that the previously-mentioned initial foaming should be very intense so as to achieve complementary homogenization in the mould of the two separately prepared lactam melts. In this regard it is possible to define empirically without extensive difficulty the magnitude of the relevant vacuum so that, in conjunction with a sufficient vacuum application time, it is possible to obtain finished components which are free of such bubble blowholes.

As regards the appropriate process control, there are the inventive principles according to which the applied vacuum is to be adjusted to a value between approximately 80 and 450 Torr in dependence on the ratio of the vacuum-exposed surface to the volume of the casting. To this end, the more powerful vacuum is chosen for the smaller ratio of the vacuum-exposed surface to the volume of the relevant casting. Furthermore, the product of this ratio of vacuum-exposed surface to the volume of the casting and the vacuum application time, which is therefore shorter than the polymerization time, should have a constant value. As regards the subsequent replacement of vacuum by the application of ambient pressure, it can also be important whether such replacement is performed instantaneously or progressively up to that time after the relevant vacuum application time is reached. Instantaneous replacement will be normally preferred because the process routine can be correspondingly simplified. In this context it can be mentioned that a cylinder of 200 mm diameter and 300 mm height, the casting of which requires approximately 40 seconds for mould filling, will have a perfect surface if the application of vacuum of approximately 130 Torr is removed approximately 90 seconds after the beginning of the operation of filling the mould.

A further feature of the invention is directed to achieve maximum strength and maximum thermal stability. To this end, the invention proposes to perform thermal treatment, at least during the polymerization of the casting, at a temperature which is approximately 10° to 20° C. lower than the crystallization melting range of the casting and that such treatment be performed after removing the vacuum applied under the previously-mentioned considerations. In this case, account will also have to be taken of the ratio of surface area to volume of the casting to which an average crystallization melting range of approximately 180° C. usually applies. Since the temperature difference between the core and the outer skin of the relevant casting is relatively small with a large ratio of surface area to volume, a feature which can be readily recognized on a relatively thin plate, it follows that such a terminal thermal treatment is less important to achieve corresponding optimum values according to the principles of the present invention. However, a more substantial temperature difference will occur between the core and the outer skin as soon as the ratio of surface area to volume is smaller as in a cylinder or in a sphere. In this case thermal treatment ensures that the outer skin approaches the temperature of the core, from which the difficulty with which the heat can dissipate increases to the extent that the ratio of surface area to volume becomes less favourable. If thermal treatment, usually performed over several hours, is carried out at the stated temperature, this will also substantially suppress the possible formation of shrinkage blowholes. In this connection, it should be mentioned that according to further principles of the present invention such shrinkage blowholes can be tolerated in specific individual cases without substantially impairing specific properties in the mechanical strength of the finished component.

It has frequently been found in performing the method according to the invention that the finished castings do not always have a usable surface so that finally attempts were made to find a method of also complementing the invention in this detailed respect. To this end, the invention proposes a mold for performing the method according to the invention in which, according to the invention, all mold wall surfaces in contact with the melts or the casting are constructed in gas-tight form. The adoption of this step means that for a mold, usually constructed in several parts, each parting joint between two mould parts must be sealed by means of a compression seal so that no air can ingress into the interior of the mould when vacuum is removed. Failure to maintain such gas-tightness will result in the production of non-usable surfaces on the casting wherever leaky places occur.

We claim:

1. In a method for producing castings by the anionic polymerization of lauric lactam in which two melts are prepared separately, one containing the catalyst and one containing the activator, and the two melts are introduced to a gas-tight mold heated to substantially the temperature of the melts and polymerized therein, the improvement which comprises:
   (a) initiating said polymerization under a vacuum sufficient to induce intense foaming of the melt and maintaining a vacuum in said mold until the viscosity of the polymerization mixture just prevents stirring, and
   (b) continuing said polymerization from said time until completion under ambient pressure,
   (c) the level of said vacuum being selected between a maximum of about 80 Torr when the ratio of the surface area of the casting exposed to the vacuum to the volume thereof is at a minimum, to a minimum of about 450 Torr when said ratio is at a maximum, and proportionately to the variation of said ratio at intermediate values thereof according to the formula $S/V \times T = K$ in which S is said surface area exposed to the vacuum, V is said volume, T is the time between the initiation of the polymerization and said time when the viscosity of the mixture just prevents stirring, and K is a constant.

2. A method according to claim 1 wherein the application of ambient pressure is carried out progressively after establishing said initial vacuum up to the time when the viscosity of the mixture just prevents stirring.

3. A method according to claim 1 wherein the ambient pressure is applied substantially instantaneously at the time when the viscosity of the mixture just prevents stirring.

4. A method according to claim 1 wherein the polymerization mixture, after the application of ambient pressure, is maintained at a temperature of about 10° to about 20° C. below the crystallization melting temperature of the casting during completion of the polymerization in order to inhibit the formation of vacuum blow holes in said casting.

* * * * *